United States Patent
Baldwin et al.

(10) Patent No.: US 7,146,495 B2
(45) Date of Patent: Dec. 5, 2006

(54) DIGITAL DOCUMENT STORAGE

(75) Inventors: Adrian Baldwin, Bristol (GB); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 10/317,536

(22) Filed: Dec. 12, 2002

(65) Prior Publication Data

US 2003/0115477 A1 Jun. 19, 2003

(30) Foreign Application Priority Data

Dec. 14, 2001 (GB) .................. 0129927.0

(51) Int. Cl.
*H06F 9/24* (2006.01)
(52) U.S. Cl. .................. 713/100; 713/168; 713/171
(58) Field of Classification Search ................ 713/100, 713/168, 171, 193
See application file for complete search history.

(56) References Cited

U.S. PATENT DOCUMENTS

| 3,938,091 | A | * | 2/1976 | Atalla et al. ............... 340/5.54 |
| 4,004,089 | A | * | 1/1977 | Richard et al. ............... 380/46 |
| 4,048,475 | A | * | 9/1977 | Yoshida ...................... 235/380 |
| 4,193,131 | A | * | 3/1980 | Lennon et al. ............. 380/281 |
| 6,134,660 | A | | 10/2000 | Boneh et al. |

FOREIGN PATENT DOCUMENTS

| WO | WO01/08346 A1 | 2/2001 |
| WO | WO01/20836 A2 | 3/2001 |
| WO | WO02/29516 A2 | 4/2002 |

* cited by examiner

*Primary Examiner*—Thomas Peeso

(57) ABSTRACT

A digital storage system for storing digital documents, the system comprising a trusted storage service provider including an encryption module for encrypting a digital document prior to storage thereof using an encryption key generated using a random number generator, remote archive storage sites for storing the encrypted item of data, and a corporate key store for storing an n-bit decryption key (which maybe the same as the encryption key or maybe different, but mathematically related thereto) for use in decrypting a document if required, the system further comprising a key degrading module for progressively degrading said decryption key by periodically discarding or changing at least one bit at a time thereof.

13 Claims, 2 Drawing Sheets

DIGITAL DOCUMENT STORAGE

FIELD OF THE INVENTION

This invention relates to digital document storage and, more particularly but not necessarily, to the secure, long-term storage of digital data and documents for future retrieval and review if required.

BACKGROUND TO THE INVENTION

There are many circumstances, both policy and legislation-related, in which it maybe required to retain documents for a relatively long period of time for future retrieval and review if required. Particularly in the case of commercial enterprises and businesses, many potentially sensitive documents are required to be retained for several years.

Traditionally, such document retention has usually been achieved by means of a paper filing system using files and filing cabinets, which may be locked or stored in a secure environment as required, with access thereto being restricted or limited to certain predetermined personnel. However, there are a number of disadvantages associated with such systems. Firstly, the physical space and resources required to adequately maintain such a storage system are often inconvenient. Secondly, in order to manage such a system practically, it is desirable to destroy or otherwise dispose of certain documents after some predetermined period of time in order to make space for more recent documents to be stored, which process can be difficult to manage methodically and consistently. Moreover, it may be desirable for certain documents to be destroyed or otherwise disposed of after a predetermined period of time to avoid leaks or compulsory disclosure of sensitive documents.

As more and more business documentation becomes computerised, the above-mentioned filing system becomes even more impractical and difficult to manage to the required standard. One specific example of digital documents and pieces of data which may exacerbate some of the problems outlined above are those created and transmitted to one or more intended recipients via electronic mail (e-mail). Such documents are routinely stored on either the recipient's hard drive or in a central networked storage facility where they can be retained as required, and from where they can be deleted upon request. However, in most commercial environments, the computer systems are routinely and regularly backed up in the sense that all stored data is copied and stored on another storage medium which is usually indexed and retained for future retrieval of documents if the main system fails for some reason. As a result, there may eventually exist a large number of copies of the same documents, and it can be difficult to ensure that all of those copies are deleted or otherwise disposed of when it is required to destroy the document in question.

In general, as more commercial documentation becomes computerised, its managed retention becomes increasingly important and, as more information is retained, there exists an associated liability that confidential information can leak or be demanded in court, with embarrassing and often commercially detrimental consequences. Many archived documents need to be stored for at least 7 years for regulatory reasons and, in many cases, will never be accessed after archiving. However, their consistent and methodical management is still essential for the above-mentioned reasons amongst others.

The present invention is primarily concerned with the reduction of the risk of unnecessary leakage of sensitive information by managing the lifetime of retained data.

If confidential documents are required to be stored digitally, it will usually be necessary to encrypt such documents prior to storage to prevent unauthorised access to their contents. Digital documents can be encrypted and decrypted by cryptography, the branch of applied mathematics that concerns itself with transforming digital documents into seemingly unintelligible forms and back again. One known type of cryptography uses a methodology which employs an algorithm using two different but mathematically related "keys", one for transforming data into a seemingly unintelligible form, and one for returning the message to its original form. Although the two keys are mathematically related, if the document storage system is designed and implemented securely, it should be computationally infeasible to derive the private key from knowledge of the public key.

However, private and public keys of this type are simply n-bit numbers and, as the computational and processing ability of modem systems increases over time, so the number of bits required to be used for public and private keys must be increased in order to ensure that a "trial and error" approach, which could otherwise be used to try and decrypt a piece of data which has been encrypted using a private key (by simply trying all of the possible n-bit combinations of respective public key) remains computationally infeasible according to current processor abilities. For example, in recent years, it has been common to employ key-based encryption/decryption systems using 56-bit keys. However, more recently, it is becoming increasingly desirable to use keys of up to 256 bits for added security.

Returning now to the problems associated with digital document storage systems, it is in many cases required to retain documents for a predetermined, relatively long period of time, but it is equally desirable to destroy or otherwise render (all copies of) such documents irretrievable after that predetermined period of time to avoid embarrassing or commercially damaging leaks or disclosure of sensitive material. Current digital storage systems do not address these issues adequately and it is an object of the present invention to achieve the above-mentioned objectives.

SUMMARY OF THE INVENTION

Thus, in accordance with a first aspect of the present invention, there is provided a digital storage system for storing items of digital data, the system comprising encryption means for encrypting an item of data prior to storage thereof using an encryption key, storage means for storing the encrypted item of data, and means for storing an n-bit decryption key for use in decrypting an item of data if required, the system further comprising means for progressively degrading said decryption key by periodically discarding or changing at least one bit at a time thereof.

Also in accordance with the first aspect of the present invention, there is provided a method of storing an item of digital data, the method comprising the steps of encrypting an item of data prior to storage thereof using an encryption key, storing the encrypted item of data, storing an n-bit decryption key for use in decrypting an item of data if required, and progressively degrading said decryption key by periodically discarding or changing at least one bit at a time thereof.

The encryption and decryption keys may be different, but mathematically associated, n-bit keys. However, in a preferred embodiment of the invention, the decryption key is the same key used to encrypt a respective item of data.

At least one bit at a time of the decryption key is preferably randomly chosen and manipulated in some way, for example, set to '0'; changed to its opposing value, or otherwise changed during the degrading process. In some cases, however, the randomly chosen bit may not be changed; or because each bit is randomly chosen, a bit may be changed back to its original value during the degrading process—the point being that whether or not a bit of the key is correct at any given time is not known.

A digital storage system according to the present invention preferably comprises storage service providing apparatus and one or more remote archive storage sites, the storage service providing apparatus comprising random number generating means for generating an encryption key, encryption means for encrypting a piece of data and transmission means for transmitting said encrypted data to one or more of said remote archive storage sites for storage.

The storage service providing apparatus may comprise storage means for storing said encryption key or an associated decryption key for decrypting said encrypted data, and means for progressively degrading said decryption key. The storage service providing apparatus preferably comprises data recovery apparatus for retrieving a piece of encrypted data from said one or more archive storage sites and for decrypting said data.

Such data recovery apparatus may comprise search means for searching over a set of possible combinations of a key which has been partially degraded so as to obtain the original key. In order to facilitate the data recovery process, the storage service providing apparatus may comprise means for appending the digest associated with a piece of data to said piece of data prior to encryption thereof. When correctly decrypted, the digest generated over the rest of the data should match the unencrypted digest.

For additional security, the data recovery apparatus may be arranged to envelope a recovered key and respective encrypted piece of data, generate a new key, and transmit said enveloped data and said new key to a party requesting said data, such that the original key does not need to be disclosed.

The progressive disintegration of the key required to decrypt a piece of data ensures that after the required predetermined period of time, the associated item(s) of stored, encrypted data can no longer be decrypted and, as such, become effectively irretrievable.

In accordance with a second aspect of the present invention, there is provided data recovery apparatus for use in a digital data storage system, said data recovery apparatus comprising means for receiving or retrieving a key which is required to decrypt a piece of data and which has been partially degraded by periodically discarding or changing at least one bit at a time thereof, means for searching over the set of possible combinations of the original key until the original key has been recovered and using said key to decrypt a respective piece of data.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
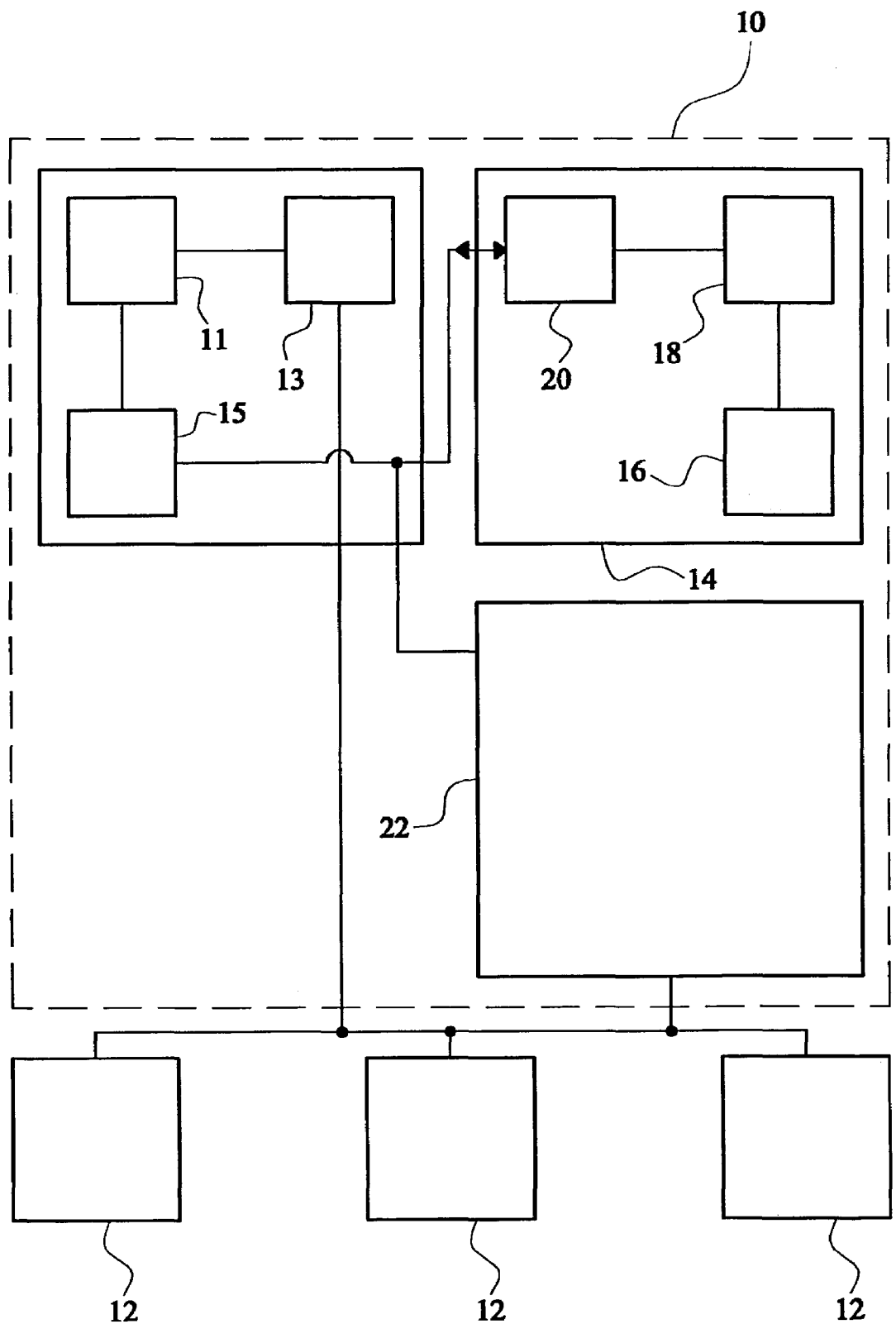
FIG. 1 is a schematic block diagram of a long-term digital document storage system according to an exemplary embodiment of the present invention.

Referring to FIG. 1 of the drawings, a commercial enterprise might typically employ a long-term document storage system managed by a storage service provider 10, which manages the long-term retention and management of digital documents on their behalf. The storage service provider may employ its own archive storage sites 12, where the documents are actually stored, but is just as likely to employ archive storage sites 12 which are owned and managed by one or more third parties to physically store the documents.

Either way, the storage service provider 10 would be the party trusted by the commercial enterprise to supply their long-term, secure document retention and management, and as such the storage service provider 10 deals with the cryptography required to maintain the requisite confidentiality of the documents to be stored prior to selection of the archive site(s) 12 to be used and transmission of encrypted data thereto.

Thus, the storage service provider 10 encrypts the data received from a customer for storage using, for example, a 56-bit key (using a random number generator 11 which is used in an encryption module 13 running an encryption algorithm using the generated key) so as to render the data seemingly unintelligible. It then transmits the encrypted data to one or more of the archive sites 12 for long-term storage. However, the key used to encrypt the data (and/or the one or more associated keys required for use in decryption of the data) are maintained and stored in a corporate key store 15 implemented by the storage service provider 10.

Prior to storage, the data files are indexed so that they can be identified. The storage service provider 10 stores the key sets required to decrypt the data files, together with information identifying the data files to which they relate.

It will be appreciated that the encrypted data stored at the archive sites 12 is of little use without the keys, and as such, the apparatus of the present invention manages the lifetime of the stored data by managing the key sets. As such, the storage service provider 10 maintains a table containing relatively innocuous index information, the encryption key and the location of the encrypted document.

The storage service provider 10 comprises a relatively simple software module 14 which is arranged to progressively degrade the stored key sets. As such, in its simplest form, the software module 14 may include a programmable timer mechanism 16, a random number generator 18, a piece of code 20 for zeroing individual bits of the key or 'flipping' such bits, i.e. changing a '1' to a '0' and vice versa. The software module 14 also includes a data recovery module 22 which will be described in more detail later.

Figure 2:
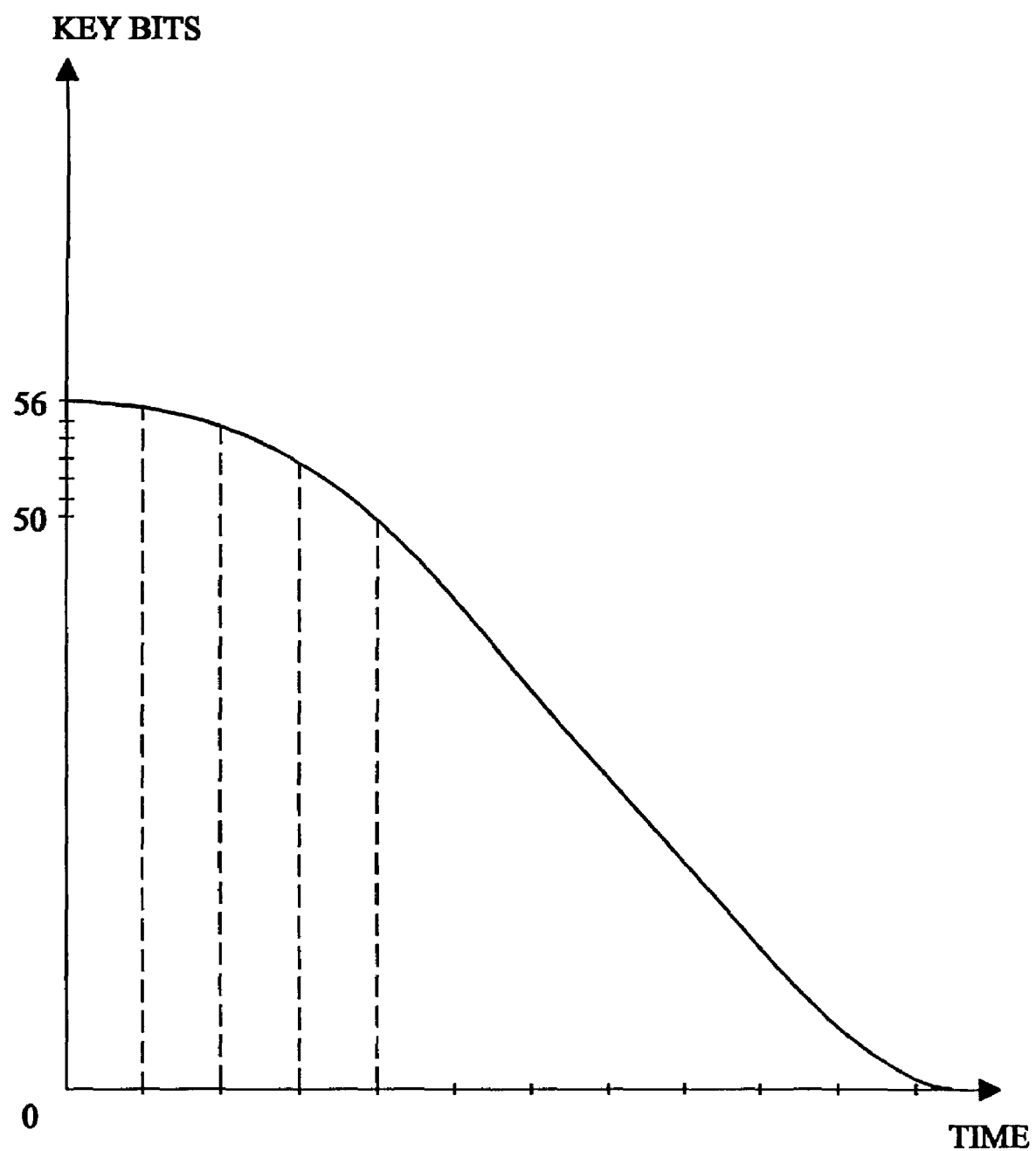
FIG. 2 a graph illustrating the progressive degrading of a key over time.

In use, for a particular key or key set, the timer mechanism 16 may be programmed to trigger the software module to degrade the respective key or key set every month, say. Thus, every month, the timer 16 triggers the random number generator to randomly select one of the (say) 56 bits of a key, and the selected bit may then be manipulated in some way, for example, set to '0' (irrespective of its initial value) changed or 'flipped' to its opposing value, or otherwise changed. In some cases, however, the randomly chosen bit may not be changed; or, because the bit is randomly chosen, the bit may end up being changed back to its original value (because it has been chosen and changed during a previous month)—the point being that whether or not the bit is correct at any given time is not known. The following month, the timer once again triggers the random number generator 18 to randomly select another bit of the key, which is then manipulated (or not) according to the selected algorithm. The above-described process is continued until, after a predetermined period of time, there is nothing left of the original key, as illustrated by the graph shown in FIG. 2.

It will be appreciated, however, that for some time, the option to retrieve the stored data must be retained. As such, the storage service provider 10 includes a data recovery module 22. While the key is still intact, it is a relatively simple matter to retrieve a selected document or piece of data from the archive storage site(s) 12 and decrypt it using the stored key. However, once degrading of the key has commenced, the recovery of a file involves searching over the set of possible combinations given by the intact portion of the key. In order to ease or facilitate the process of recognising when the correct file has been found, the file's digest may be appended to the end of the file prior to encryption. When correctly decrypted, the digest generated over the rest of the file should match the unencrypted digest.

It will be appreciated that the key becomes effectively useless long before it has completely degraded. Consider that the 56-bit key has been degraded by 1 bit. At that point, the respective encrypted data can be recovered by changing every one of the 56 bits which could have been changed until the correct combination of bits is arrived at. When two bits of the key have been changed, the number of combinations which need to be tried to retrieve the key and decrypt the respective data file is $(56)^2$. When three bits have been changed, the number of combinations to be tried becomes $(56)^3$, and so on. Thus, as the key sets are degraded over time, they can still be recovered for a certain period of time, but at a cost which grows exponentially over time until it is essentially impossible from a practical point of view, and the document is effectively lost.

Since the key storage is an essential part of the document destruction system of the present invention, it is essential that the original key is not disclosed to anyone and that copying of the keys is strictly limited. As such, in a preferred embodiment of the present invention, the recovery module 22 would be arranged to take the bits of a recovered key and the respective encrypted file, search for the correct result and preferably envelope the data for the intended recipient with a new key. Ideally, the software used by the recipient would not allow them to copy or store their copy of the document. However, the storage service provider 10 may need to act as a registry of who has seen copies of the document and remind them to adequately destroy the document. It may even be possible to 'watermark' the images so that leaks of information can be attributed to particular individuals or bodies.

Although the archive database and encrypted data needs to be stored on large disks or the like, a secure hardware token could be used to perform the encrypt/decrypt and key degrading operations to ensure that the key could never leak. To archive a document, the whole document would be sent to the secure hardware token which would generate a symmetric encryption key (using a hardware random number generator), encrypt the file, and encrypt and add the file digest to the end. The key and associated management information can then be encrypted with the token's public key and sent to the archive site disks. The archive sites would periodically send the encrypted key to the hardware token which would degrade the key and re-encrypt the degraded version. A final date for the key and document can be included in this data such that if the hardware token is provided with a secure clock, it would only perform decrypts within the given time periods.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. A digital storage system for storing items of digital data, the system being arranged to encrypt an item of data prior to storage thereof using an encryption key, store an encrypted item of data and an n-bit decryption key for use in decrypting said item of data if required, the system being further arranged to progressively degrade said decryption key by periodically discarding or changing at least one bit at a time thereof.

2. A digital storage system according to claim 1, wherein said decryption key is the same key used to encrypt a respective item of data.

3. A digital storage system according to claim 1, wherein at least one bit at a time of the decryption key is set to "0", changed to its opposing value, or otherwise changed or manipulated.

4. A digital storage system according to claim 3, wherein said at least one bit is substantially randomly selected.

5. A digital storage system according to claim 1, comprising storage service providing apparatus and one or more remote archive storage sites, the storage service providing apparatus comprising a random number generating system for generating an encryption key, an encryption system for encrypting a piece of data and a transmitter for transmitting said encrypted data to one or more of said remote archive storage sites for storage.

6. A digital storage system according to claim 5, wherein said storage service providing apparatus is ranged to store said encryption key or an associated decryption key for decrypting said encrypted data, and progressively degrade said decryption key.

7. A digital storage system according to claim 5, wherein said storage service providing apparatus comprises data recovery apparatus for retrieving a piece of encrypted data from said one or more archive storage sites and for decrypting said data.

8. A digital storage system according to claim 7, wherein said data recovery apparatus comprises a search facility for searching over a set of possible combinations of a key which has been partially degraded so as to obtain the original key.

9. A digital storage system according to claim 7, wherein said storage service providing apparatus is arranged to append a digest associated with a piece of data to said piece of data prior to encryption thereof.

10. A digital storage system according to claim 7, wherein said data recovery apparatus is arranged to envelope a recovered key and respective encrypted piece of data, generate a new key, and transmit said enveloped data and said new key to a party requesting said data.

11. A method of storing an item of digital data, the method comprising the steps of encrypting an item of data prior to storage thereof using an encryption key, storing the encrypted item of data, storing an n-bit decryption key for use in decrypting an item of data if required, and progressively degrading said decryption key by periodically discarding or changing at least one bit at a time thereof.

12. Data recovery apparatus for use in a digital data storage system, said data recovery apparatus being arranged to receive or retrieve a key which is required to decrypt a piece of data and which has been partially degraded by periodically discarding or changing at least one bit at a time thereof, search over the set of possible combinations or the original key until the original key has been recovered and use said key to decrypt a respective piece of data.

13. A digital storage system for storing items of digital data, the system comprising an encryption facility for encrypting an item of data prior to storage thereof using an encryption key, a storage location for storing an encrypted item of data and for storing an in-bit encryption key for use in decrypting said item of data if required, and a degrading function for progressively degrading said decryption key by periodically changing at least one randomly-selected bit at a time thereof.

* * * * *